Patented Sept. 10, 1946

2,407,494

UNITED STATES PATENT OFFICE 2,407,494

LOW-TEMPERATURE PROCESS OF POLYMERIZING ISOOLEFINIC MATERIAL

Harman Hartvigsen, Scotch Plains, N. J., assignor, by mesne assignments, to Jasco, Incorporated, a corporation of Louisiana Application January 2, 1941, Serial No. 372,947

7 Claims. (Cl. 260—94)

This invention relates to polymeric materials of the olefinic type; relates particularly to methods for the polymerization of olefinic materials; and relates especially to a polymerization device for conducting the polymerization of the olefins by the controlled and rapid addition and dispersion of the catalyst into the olefinic reactants.

Various olefinic mixtures are readily polymerized into very high molecular weight substances by the application to the olefins at very low temperatures of active halide, or Friedel-Crafts, type catalyst; especially isobutylene at temperatures ranging from 0° C. to −100° C., under the influence of a catalyst such as boron trifluoride, in the presence of diluent-refrigerants such as liquid propane, liquid ethane, liquid ethylene and the like; and olefinic mixtures such as iso-olefins of the type of isobutylene in admixture with di-olefins such as butadiene, isoprene, pentadiene, dimethyl butadiene and the like, in the presence of similar diluent-refrigerants, and especially by the application to the mixed olefins of a Friedel-Crafts type catalyst such as aluminum chloride dissolved in a low freezing solvent such as ethyl chloride or methyl chloride or carbon disulfide or the like.

In this polymerization process, however, difficulty has been experienced in the incorporation of the catalyst into the reactant mixture. The reaction is very rapid, and to obtain an optimum molecular weight, especially optimum molecular weight with satisfactory heteropolymerization from the mixed olefin and di-olefin reactants, there is required a very rapid and complete dispersal of the catalyst into the reactant-refrigerant diluent mixture. When gaseous boron trifluoride is bubbled into the reactant mix, the interface between the surface of the bubbles and the reactant mixture is a location of relatively high catalyst concentration, and the polymerization occurs in the neighborhood of the interface under conditions of low concentration of reactants in proportion to the concentration of catalyst, and the catalyst efficiency is markedly reduced. Similarly when the liquid catalyst solution of aluminum chloride is added to the reactant mix, a similar interface occurs between the catalyst solution and the reactant mix, until the catalyst solution has been fully dispersed into the reactant mixture. In consequence, a similar condition of reaction in the presence of a relatively low quantity of reactants occurs, and even the most powerful stirring of the reactant mix is not adequate to disperse the necessary amount of catalyst into the reactant mix before undesirable reactions occur.

The present invention provides a powerful stirring device of the propeller type, which is equipped with channels adjacent the trailing edge of the propeller, through which the catalyst, either gaseous or liquid solution, is discharged into the eddy zone behind the trailing edge of the propeller, in which zone dispersal forces far more powerful than are obtainable by any simple stirring procedure are utilized for the dispersal of the catalyst into the reactant mix. It is found that under such conditions, a sufficiently rapid dispersing of the catalyst into the reactant mix occurs to avoid substantially all of the undesired reactions which otherwise occur in simple mixing of the catalyst and reactants.

Thus an object of the invention is to polymerize an olefin-containing mixture at low temperature by the ultra rapid dispersal of catalyst or catalyst solution into and through the eddy zone in the reactants behind a propeller type mixing stirrer. Other objects and details of the invention will be apparent from the following description when read in connection with the accompanying drawings wherein Fig. 1 is a view in vertical section through a polymerization reactor equipped with a catalyst disperser according to the invention.

Figure 1:
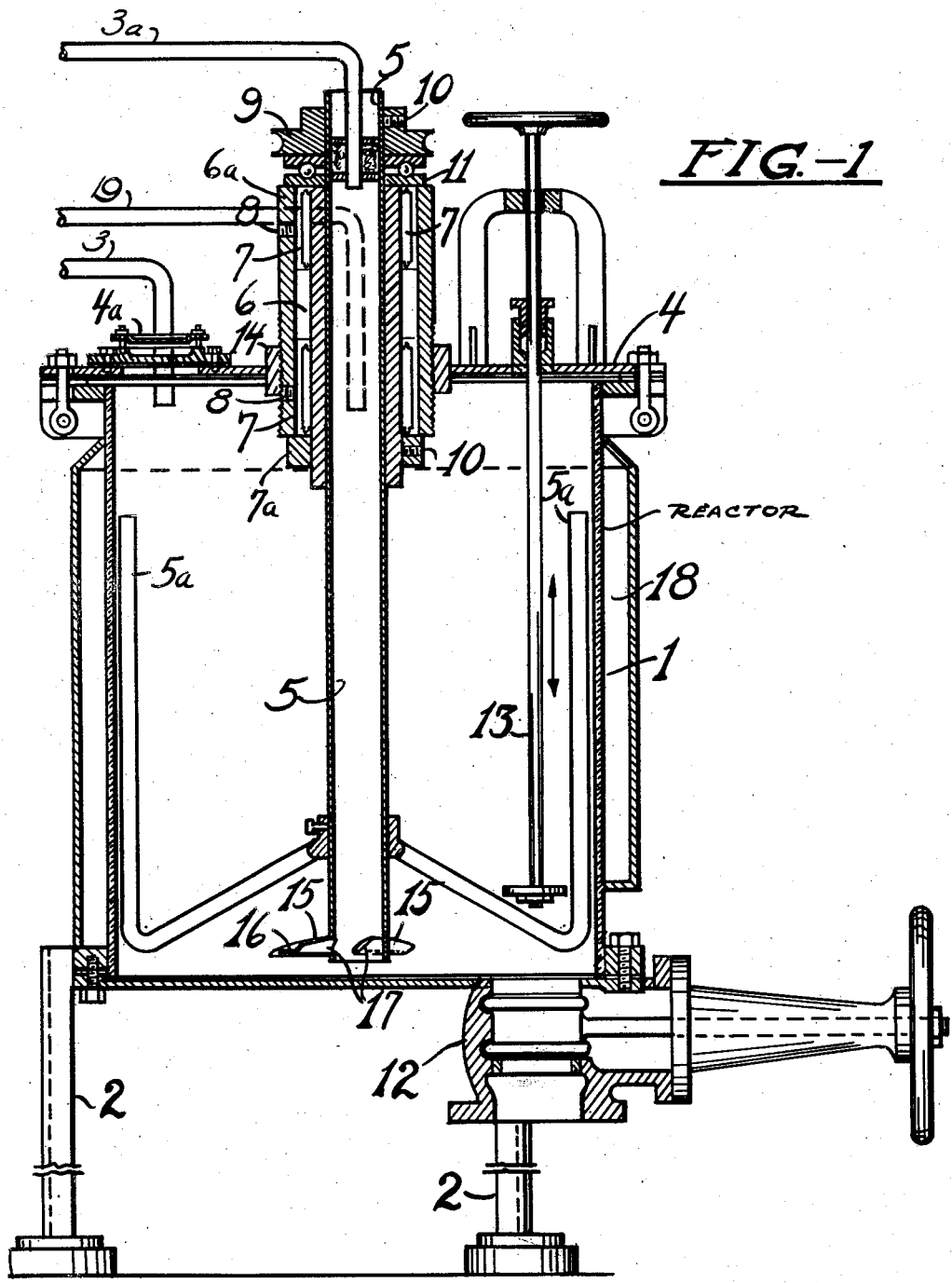
Figure 2:
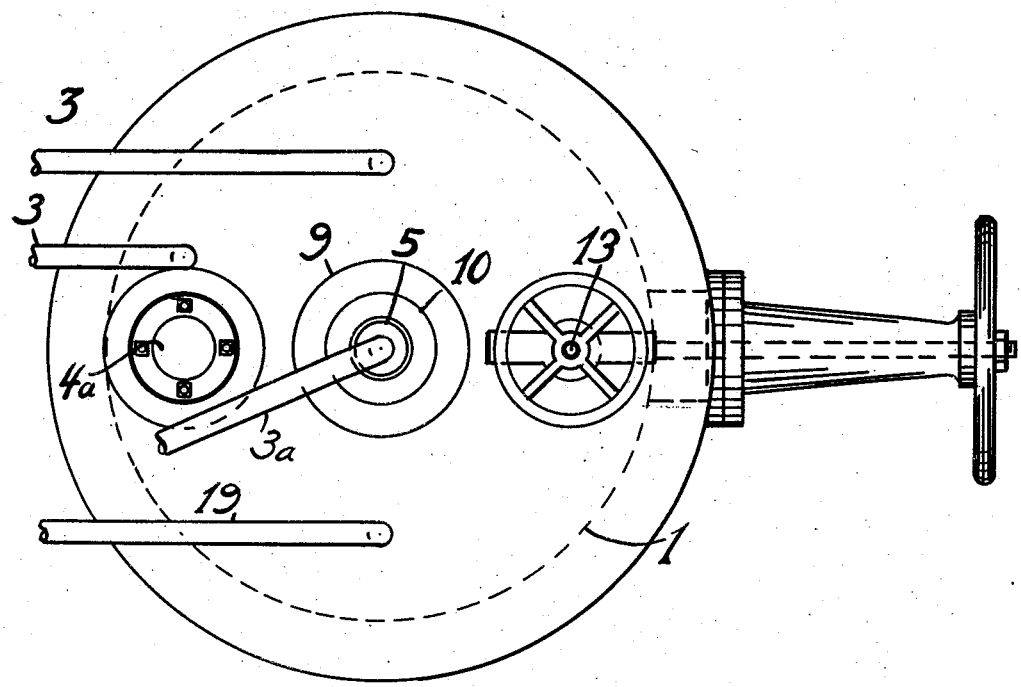
Fig. 2 is a top view of the device of Fig. 1.

Referring to Figs. 1 and 2, there is shown a desirable embodiment of the invention including a polymerization reactor 1 carried upon appropriate support members 2 and equipped with pipe lines 3 passing through a cover 4 for the delivery to the reactor of the various components of the reaction mixture including the olefinic material, and the diluent refrigerant. Within the reactor chamber there is provided the catalyst disperser of the present invention which includes a hollow shaft 5, which shaft is cylindrical in formation and supported by set screw 10 carried in the pulley 9, upon the thrust bearing 11, the inner cylinder 6, the outer cylinder 6a, and the lock nuts 14, which are respectively connected to the top member or cover 4 of the reaction vessel. The roller bearings 7 are held in place by set screws 8. A collar 7a and the set screw 19 are a means for adjusting this assembly.

As is clearly shown by Fig. 1, the body portion of the hollow shaft is provided with propeller type hollow blades 15 which have openings 16 at the trailing edges of the blades through which the catalyst is dispersed as it passes through the inner opening 17 of the shaft, after delivery thereto through a catalyst delivery pipe 3a.

In the operation of this embodiment of the invention, a suitable quantity of the refrigerant, which may be liquid propane or liquid ethane or liquid ethylene, is delivered through the supply pipe line 3 to the reactor 1. The reactor, which is preferably glass lined or enamel lined, is cooled rapidly by volatilization of the refrigerant (aided by the cooling effect of liquid ethylene in the refrigerant jacket 18), and the volatilized gas is discharged through an exit pipe line 19. for condensation and recycling or other use. When the reactor and other members of the device are cooled to the desired low temperature, the desired quantity of olefin, which may desirably be liquid isobutylene, is delivered through another delivery pipe line 3 to the reactor. At any convenient time up to this point, a power source associated with the driving pulley 9 is put into operation, to rotate the shaft 5 and the propeller blades 15. When the desired charge of reactant mix has been built up in the reactor, and the propeller blades 15 are revolving rapidly, the catalyst is delivered to the hollow shaft 5 from the associated pipe line 3a. This catalyst may be gaseous boron trifluoride, under low pressure, especially when the reactant mixture in the reactor contains only isobutylene as the reaction material. The gaseous catalyst is then discharged through the hollow blades 15 as shown and flows outward through perforations at the trailing edges of the blades. The speed of rotation of the stirring propeller desirably ranges between 400 R. P. M. and 1500 R. P. M., depending upon the character of the reactants. the relative sizes of the reactor and the propeller and the character and rate of delivery of the catalyst. The rapidly churning eddies produced at the trailing edge of the propeller disperse the catalyst into the reaction mixture at an exceedingly rapid rate, probably in time intervals measured in thousandths of a second, and the catalyst is dispersed in bubbles or droplets so small that they are completely dissolved through the solution interface into the reactant mix before the polymerization reaction has proceeded to such an extent as to make any substantial change in the concentration of the reactants adjacent the interface of the bubble.

To the present it has not been possible to determine the size of bubbles or droplets produced by this device, nor has it been possible to measure the reaction rate, but inspection of the equipment in operation indicates that the reaction rate is very rapid and the bubbles or droplets exceedingly small.

The delivery of the catalyst through the propeller blades is continued until the desired amount of polymerization has been obtained. When this stage is reached, as determined by inspection of the reactant mix through the sight glass 4a, the delivery of catalyst is stopped and the reaction is desirably quenched by the application to the reaction mixture of an oxygenated organic liquid such as an alcohol, or aldehyde, or even an acid, or water, or alkaline solution, or ammonia, or other suitable catalyst-quenching material.

The reactor may then be discharged in any convenient manner such as by draining the residual diluent refrigerant and unpolymerized materials through a bottom outlet such as a gate valve 12, aided by a push rod 13; or by scooping out the solid polymer, or by other means.

By this procedure there is thus readily obtained a very high molecular weight poly-isobutylene. If liquid ethylene is used for the diluent refrigerant, giving temperature of approximately —93° C. (ethylene alone boils at approximately —103° C.) and high purity isobutylene is used with boron trifluoride as catalyst, this reactor equipped with the catalyst disperser as shown in Fig. 1 is capable of producing poly-isobutylene having molecular weights ranging from 100,000 up to 450,000 or above, substantially free from undesirably low molecular weight materials.

This embodiment of the invention is particularly advantageous for the preparation of copolymers or interpolymers or heteropolymers of mixed olefins such as isobutylene with a diolefin to give a plastic elastic material of high molecular weight, and low unsaturation, which can be cured with sulphur.

For this use, the reactor is desirably equipped with side wall scrapers 5a, which may be mounted on, and driven by the catalyst tube 5, but are preferably independently mounted and driven in an oscillatory manner, as by a packed shaft passing through the bottom of the reactor.

In conducting this polymerization, the reactor is charged with an appropriate quantity of liquid ethylene to bring the temperature to the desired low value and to provide in the reactor a substantial quantity of residual liquid ethylene, sufficient to maintain the desired low temperature through the entire reaction. To this quantity of liquid ethylene there is then added an appropriate quantity of a mixture of isobutylene and a diolefin such as butadiene, isoprene, pentadiene, or dimethyl butadiene (as above mentioned) in the proportion of from 70 to 99 parts of the isobutylene with 30 to 1 parts of the diolefin, together with from 200 to 500 parts of the liquid ethylene. At any convenient stage during the preparation of this mixture, the propeller shaft 5 is put into rotation and with it the blades 15 are likewise rotated. The speed of rotation is desirably about 1000 R. P. M.

Meanwhile a catalyst solution consisting of $AlCl_3$ dissolved in methyl chloride to a concentration of 0.5 gm. per 100 cc. is prepared and chilled to about —78° C. and admitted to the top of the hollow shaft 5 at a rate of about 100 cc. per minute. The catalyst solution flows down the walls of the hollow shaft through the opening at the bottom 17 into the hollow blade 15 where it is thrown out into the reactant mix, through the opening 16 at the trailing edge of the blades 15.

The liquid catalyst is thrown out through the trailing edge of the propeller blades under conditions of relatively high pressure because of the centrifugal force developed by the speed of rotation and it is thrown in relatively small streams into the eddy zones behind the trailing edge of the blades and the reaction between the stream of catalyst solution and the vigorous eddies results in a very rapid dispersal of the catalyst into exceedingly small droplets which are absorbed in a very short period of time into the body of the solution. The rapid stirring of the main body of the solution, together with the high degree of dispersal of the catalyst solution results in a highly advantageous polymerization condition. In consequence a relatively high molecular weight polymer is obtained which also is substantially free from undesirable, low molecular weight interpolymers.

The reaction of the mixed iso-olefinic and di-olefinic materials in the presence of the dissolved aluminum chloride catalyst occurs at a slower rate than the reaction with the iso-olefin alone, and the diolefin exerts a marked poisoning effect upon the polymerization reaction. Accordingly conditions of stirring and temperature which produce a very high molecular weight simple poly-isobutylene produce a considerably lower molecular weight interpolymer which may range from 65,000 to 200,000. Also it is usually desirable that the reaction be quenched when from 65% to 95% of the mixed reactants have polymerized. For this purpose the reaction is desirably quenched by the addition of an alcohol or other oxygenated liquid or water or alkali, as above indicated. The interpolymer resulting from this polymerization reaction has a relatively low iodine number, preferably ranging between 1 and 9; yet it is reactive with sulphur for a curing reaction which develops in it an elastic limit and a definite tensile strength. For this purpose the polymer as removed from the reactor is desirably washed with water in a Werner and Pfleiderer type of kneader to remove residual traces of catalysts and quenching liquids. It is then compounded with sulphur in approximately the proportion of 3 parts, zinc oxide in the proportion of 3 parts, stearic acid in the proportion of 3 parts, and a vulcanizer in the form of "Tuads" (tetra methyl thiuram disulfide) one part, per hundred parts of the polymer, and if desired, with from 50 to 200 parts of carbon black. The resulting compound may be moulded and cured under heat and pressure for a time interval ranging from 15 to 60 minutes at a temperature ranging from 135° C. to 165° C. The resulting cured polymer has a tensile strength ranging from 3000 pounds to 4600 pounds per square inch and an elongation at break ranging from 900% to 1250%.

In this reaction considerable heat is liberated which is removed by vaporization of the liquid ethylene refrigerant-diluent. Also the quality of the product is an inverse function of temperature, thereby necessitating a well-controlled reaction to insure against localized overheating. If the catalyst is added in a stream, or added too rapidly the reaction becomes unduly violent with evolution of more heat than can be removed by the vaporization of liquid ethylene, resulting in a lowered molecular weight and poorer quality product. By using the dispersion blades for catalyst introduction, a smooth, well-controlled reaction is obtained as evidenced by the manner in which the copolymer forms and by the excellent quality of the finished product.

Figure 3:
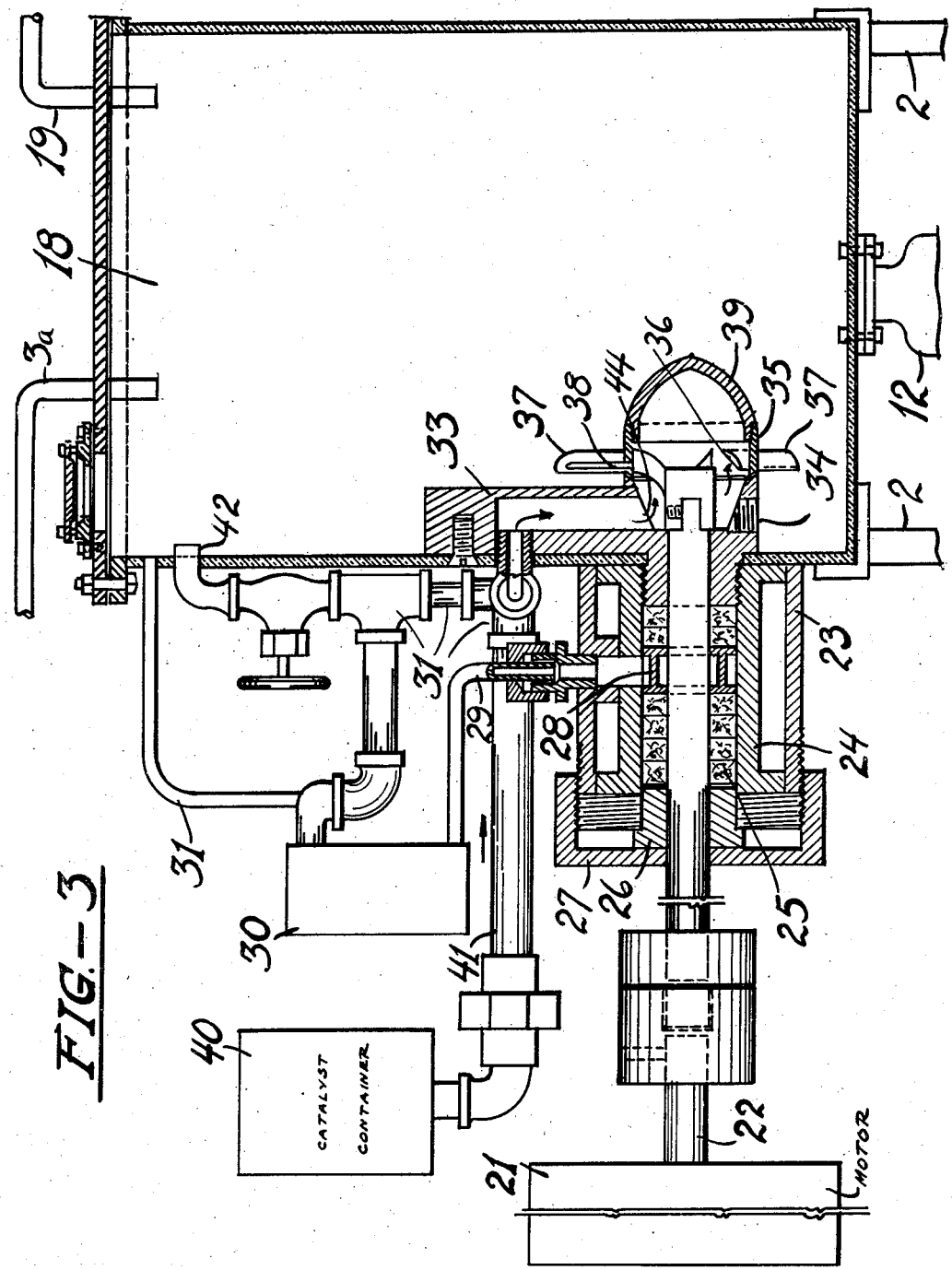
Fig. 3 is a view in vertical section of an alternative embodiment of the polymerization reactor and catalyst disperser of the invention.
Figure 4:
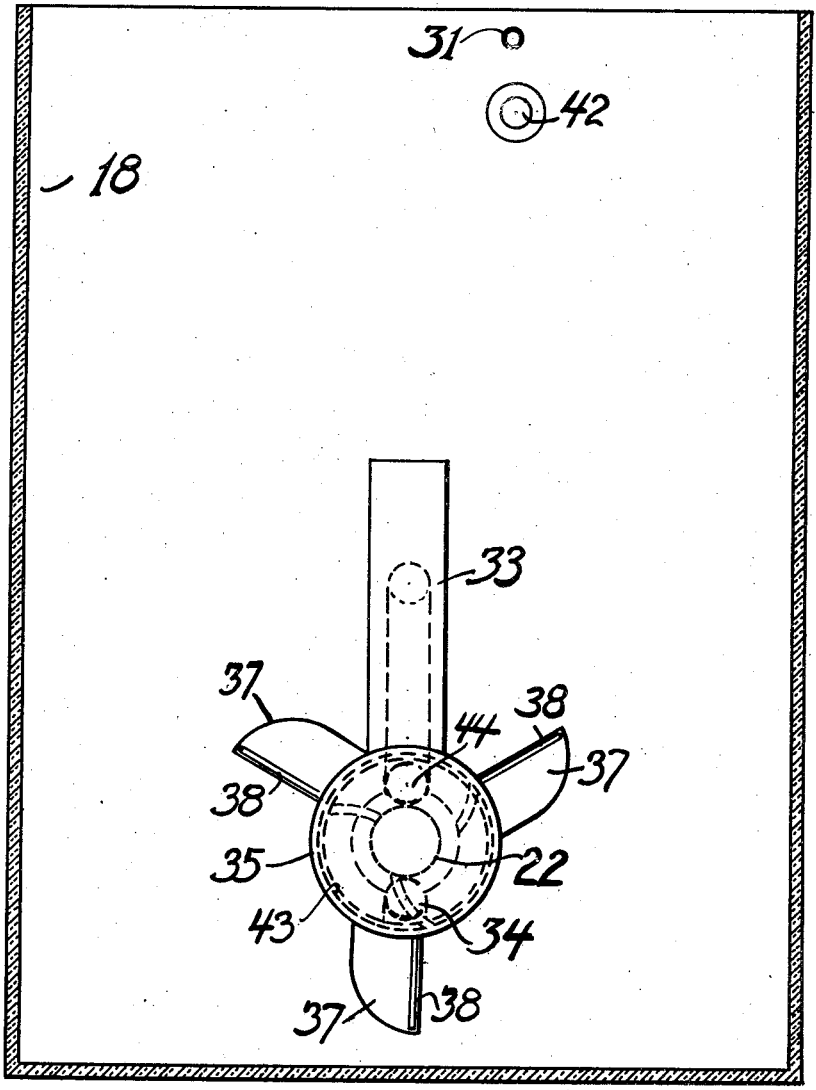
Fig. 4 is a view in side elevation of the propeller disperser of the invention.

Figs. 3 and 4 show an alternative embodiment of the invention in which the propeller is inserted through the side wall of the reactor, carried on a solid shaft in a horizontal position.

Referring to these figures, this alternative embodiment of the catalyst disperser of the invention includes a motor 21 connected to the shaft 22 on which are mounted the stirring blades 37. A packing gland 24 is provided for sealing the shaft 22 into the reaction vessel 18. A jacket 23 around the packing gland 24 is used for circulating water to remove the heat due to friction. A soft packing 25 seals the shaft 22 and the free coupling 26 prevents distortion of the packing which is adjusted or tightened by means of cap 27. The lantern ring 28 is a means of placing liquid around the shaft 22 to seal the reaction vessel 18. For conducting the low temperature polymerization reactions it is not necessary to have the lantern ring assembly in the reaction apparatus. However, in conducting reactions other than those of low temperature, this lantern ring assembly is essential and practical for purposes of equalizing the pressure in the packing gland so as to seal the shaft. A feed line 29 is provided to carry the liquid stored in the cylinder 30 into the lantern ring 28. A vent 31 is provided in the form of a cylindrical tube with a small bore to balance the pressure between the lantern ring 28 and reaction vessel 18. The pressure in the lantern ring forces the liquid from the supply cylinder past the packing instead of the gaseous reactants in the reaction vessel. A hollow conveyor 33 is provided having a bearing surface on one side for the shaft 22 and an opening provided around that shaft on the opposite side, including an aperture through the hollow side of the conveyor leading to the outside of the reaction vessel. The outside surface around the bearing side of the hub is threaded to afford means of tightening and sealing the member 33 and packing gland 24 to the reaction vessel 18 with the necessary gaskets in between. Above the aperture leading to the hub there is provided a bolt to help seal the hub.

The propeller blade housing 35 has a solid core drilled to fit the shaft 22 and is provided with impeller blades 37. This housing has enough clearance between it and the member 33 to allow the housing to revolve. Openings 36 through the housing to the hollow blades 37 connect to openings 38 in the trailing edges to permit the dispersion of the catalyst solution. A removable cap 39 is threaded at the open end so that it can be screwed into the propeller blade housing 35 particularly when not feeding the catalyst solution. An opening 34 which is tapped for a plug is provided as a means of tightening the set screws in the propeller blade housing. This opening is tapped and plugged so as to seal the member 33. The catalyst stored in container 40 is conveyed through a pipe 41 to the aperture of the trailing edge of blade 37. The opening 42 permits the flow of gases or vapor through the unit so as to accelerate the polymerization reaction particularly in the case where the gaseous catalyst in the reaction vessel is distributed throughout the liquid reactants in the reaction vessel.

In the operation of this embodiment of the invention, the reactor is filled with the desired mixture of diluent-refrigerant and reactants, which latter may be the simple iso-olefin such as isobutylene or may consist of the mixed olefins such as isobutylene and a diolefin as above described. When the reactor and its attachments have been cooled to the desired low temperature (with the aid of a refrigerating jacket as in Fig. 1 if desired), and the mixture in the desired proportions as above indicated fully prepared in the reactor, the stage of addition of the catalyst is reached. The propeller blade mixer is previously put into rotation, and the flow of catalyst may then be started. The catalyst may consist of gaseous boron trifluoride from the cylinder 40, which passes through the fitting 33 to the blade frame, and thence through the openings 38 in the trailing edge of the blades 37 into the eddy behind the blade where it is rapidly and powerfully dispersed into the reactant mixture.

Alternatively a liquid catalyst may be used such as the above described solution of aluminum chloride in a low freezing solvent. In this instance also the liquid catalyst solution is discharged from the cylinder 40 through the pipe 41, the fitting 33 to the propeller hub 35 and the blades 37 and the openings 38, into the eddy behind the trailing edge of the blade where it is rapidly dispersed as above described to produce the desired polymers.

The embodiments of the invention above described utilize a propeller type of stirrer immersed in a simple cylindrical type of reactor container. It is not, however, necessary that they be so immersed. Alternatively the propeller type stirrer may be placed within a circulating tube exterior to the main reactor container, the propeller type stirrer being utilized to withdraw portions of the reaction mixture from the body within a reaction chamber and to discharge the mixture after dispersing the catalyst therein back into the main reaction chamber. If desired, the main reactor may be equipped with a travelling strainer for removing the solid polymer from the reaction mixture as it accumulates in the main reactor container, thus minimizing the length of time during which the solid catalyst is in contact with the reaction mixture, thereby further minimizing the production of undesired low molecular weight polymer. This embodiment may be operated upon successive batches of reactive mixture, or it may be operated in continuous manner by discharging into the reactor the necessary continuous supply of reactant mixture containing the reactants and refrigerants in the proportions in which they are removed by the reaction.

Alternatively the same type of propeller disperser may be utilized within a pipe conduit by which a fresh reactant mixture is withdrawn from a supply chamber, the catalyst dispersed by the propeller type disperser into the stream of reactant mixture in the conduit, and the whole discharged into a reaction chamber together with a supply of catalyst-quenching agent, the solid polymer being removed by a travelling strainer, and the residual liquids fractionally distilled to recover the various components for recycling.

Thus the invention provides a new process by which a catalyst is dispersed at low temperature into an eddy zone behind a propeller type stirrer for the ultra rapid and thorough dispersion of or incorporation into a reactant mix for the polymerization of the reactant mix with a minimum of undesired polymers; and a device consisting of a propeller type stirrer having ducts at the trailing edge of the propeller blade for the discharge of catalyst directly into the eddy behind the trailing edge of the stirrer blade.

The apparatus above disclosed is intended primarily for the incorporation of catalyst, either as gas or as a solution, into a reactant mixture of olefins, with the powerful dispersing effect of the eddies at the trailing edges of the blades being utilized to incorporate the catalyst into the reaction mixture in the shortest possible time. The advantages of this powerful incorporating and dispersing effect are not, however, limited to such olefinic reaction mixtures at low temperature. The same apparatus (made in stainless steel or other non-corrosive metal) may be used for the acid absorption of refinery olefins; the acid being stirred into, dispersed in and caused to react with the olefins by passing thru the hollow blades into the eddies behind the trailing edges, in substantially the same way in which the catalyst, either gas or liquid, moved in the above described embodiments. The same procedure, and the same apparatus may be used for treating naphthas, oils, etc., with reagents such as alkali solutions, doctor solutions, solvent extraction liquids and the like. The apparatus and procedure are similarly useful for alkylation reactions, the acid and isoparaffins being agitated with and dispersed into the hydrocarbons through the eddies behind the trailing edges of the blades as above described. In this instance, after the acid and isoparaffins have been added, the material in the reactor chamber may be recirculated as a mixture, thru the propeller blades and into the eddies behind the trailing edges thereby obtaining a very satisfactory, long continued, intimate contact between the acid and hydrocarbon liquids.

While there are above disclosed but a limited number of embodiments of the device of the invention, it is possible to provide still other embodiments without departing from the inventive concept herein disclosed and it is therefore desired that only such limitations be imposed upon the appended claims as are stated therein or required by the prior art.

I claim:

1. In the low temperature polymerization of iso-olefins to high molecular weight polymerization products which are formed as solids under the reaction conditions by addition of a suitable polymerization catalyst to a cold liquid medium containing said iso-olefin at temperatures between 0° C. and −100° C., an improved method of operation comprising turbulently agitating the liquid medium by a rotating member therein having a trailing edge, delivering a fluid Friedel-Crafts polymerization catalyst through the trailing edge of the said rotating member, and introducing said fluid polymerization catalyst through said trailing edge into the cold reaction medium to cause rapid dispersion of the catalyst therein with immediate formation of solid polymerization products which are projected away from the zone of catalyst introduction by the driving action of the said rotating member.

2. Process according to claim 1, in which said iso-olefin is isobutylene and in which the said catalyst is a Friedel-Crafts catalyst solution.

3. Process according to claim 1, in which said iso-olefin is isobutylene and said catalyst is boron fluoride.

4. In the low temperature copolymerization of iso-butylene with a conjugated diolefin of 4 to 6 carbon atoms per molecule to high molecular weight copolymerization products which are formed as solids under the reaction conditions by addition of a suitable polymerization catalyst to a cold liquid medium containing said reagents at temperatures within the range between 0° C. and −103° C., an improved method of operation comprising turbulently agitating the liquid medium by a rotating member therein having a perforated trailing edge, delivering a fluid Friedel-Crafts catalyst through the said openings through the trailing edge of the said blades, and introducing said fluid polymerization catalyst through the perforated edges in said rotating member into the cold reaction medium to cause rapid dispersion of the catalyst therein with immediate formation of solid polymerization products which are projected away from the zone of catalyst introduction by the driving action of the rotating member.

5. Process according to claim 4, in which said catalyst is a Friedel-Crafts catalyst dissolved in a solvent which is liquid at the reaction temperature.

6. Process according to claim 4, in which said catalyst comprises a solution of aluminum chloride in methyl chloride.

7. A low temperature polymerization process comprising the steps of cooling isobutylenic material to a temperature between its liquefaction point and −100° C., rotating a stirrer therein at a speed between 400 and 1500 R. P. M. to develop a turbulence zone in the isobutylenic material adjacent the trailing edge of the stirrer and delivering into the turbulence zone a polymerization catalyst to initiate polymermization of the isobutylenic material in the turbulence zone.

HARMAN HARTVIGSEN.